No. 857,845. PATENTED JUNE 25, 1907.
D. H. STEWART.
JOURNAL BEARING AND PROCESS OF MAKING SAME.
APPLICATION FILED SEPT. 15, 1905.
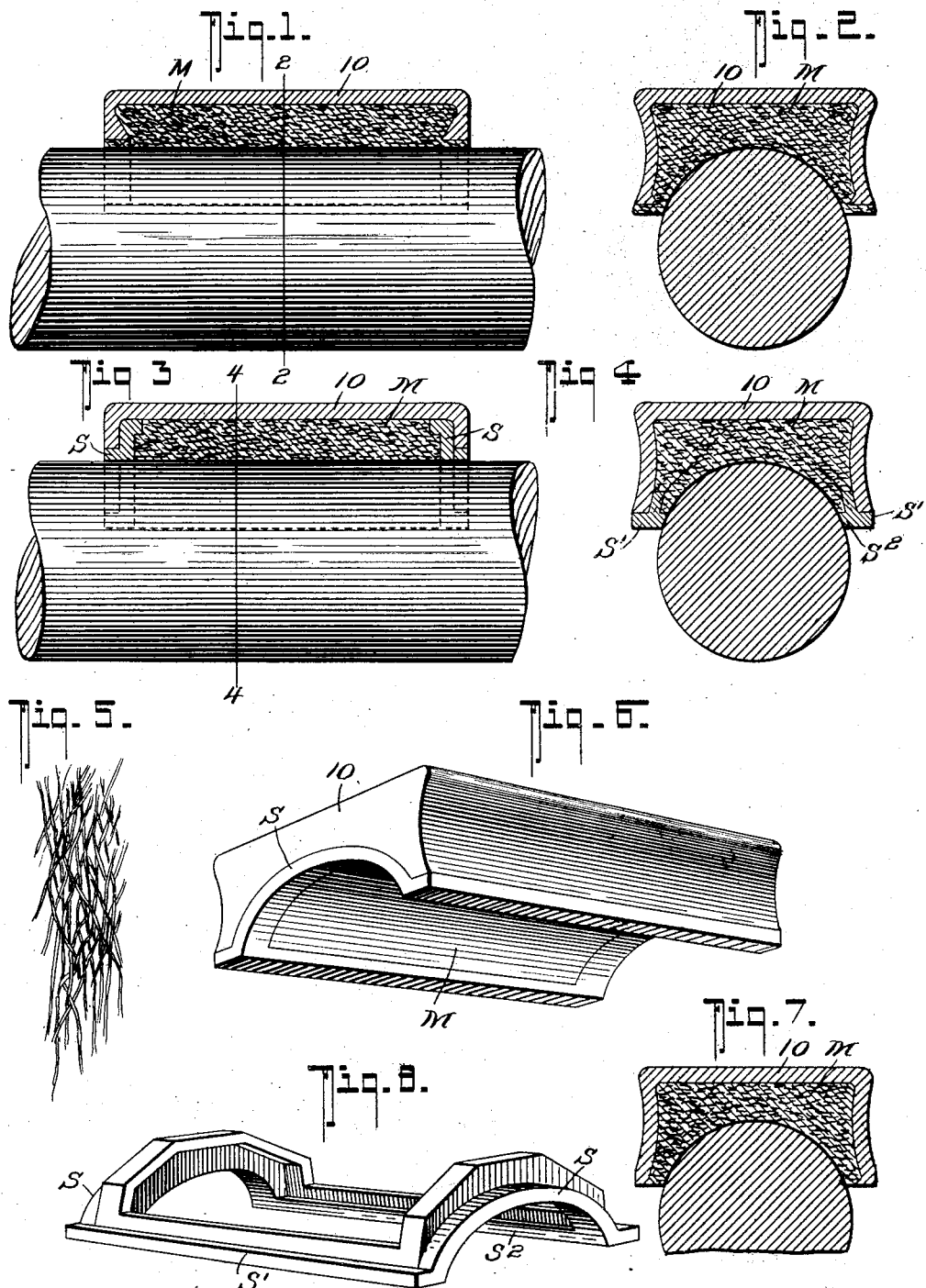
WITNESSES:
F. C. Gibson.
John T. Schrott.
INVENTOR
David H. Stewart.
BY
Fred G. Dieterich & Co.
ATTORNEYS

UNITED STATES PATENT OFFICE.

DAVID H. STEWART, OF PITTSBURG, PENNSYLVANIA.

JOURNAL-BEARING AND PROCESS OF MAKING SAME.

No. 857,845. Specification of Letters Patent. Patented June 25, 1907.

Application filed September 15, 1905. Serial No. 278,616.

*To all whom it may concern:*

Be it known that I, DAVID H. STEWART, residing in Pittsburg, in the county of Allegheny and State of Pennsylvania, have invented certain new and useful Improvements in Journal-Bearings and Processes of Making Same, of which the following is a specification.

My present invention seeks to provide an improved construction of journal bearing and the method of manufacturing the same and relates more especially to that type of journal bearings having a box or shell and a composition bearing held therein.

In its generic nature, my invention comprehends the process of providing a mass of anti-friction metal in shredded or comminuted form and compressing same in a solid mass within a holder or receiver.

In its more specific nature, my present invention comprehends an improved construction of journal bearing, comprising a box of cast metal having a main bearing surface of shredded or comminuted particles of bearing metal compressed together with a solid lubricant, such as graphite, and provided with supplemental bearing metal surfaces combined with the main bearing surface in a manner to keep the cast metal box or shell from contacting with the journal.

In its still more specific nature, my invention consists of an improved construction of journal bearing or box consisting of the details of construction and novel arrangement of parts hereinafter fully explained, specifically pointed out in the claims and illustrated in the accompanying drawings, in which, Figure 1, is a longitudinal section of the simplest form of my journal bearing. Fig. 2, is a cross section thereof on the line 2—2 on Fig. 1 Fig. 3, is a longitudinal section of the preferred form of my improved journal bearing. Fig. 4, is a cross section thereof on the line 4—4 of Fig. 3. Fig. 5, is a detail view showing the manner in which the bearing metal substance is shredded before it is coated and pressed into a solid mass. Fig. 6, is a perspective view of the form of bearing shown in Fig. 3. Fig. 7, is a cross sectional view of a further modification hereinafter further referred to. Fig. 8, is a perspective view of the solid metal frame or receiving portion of my journal bearing.

In carrying out my invention, I prepare a bearing body formed of anti-friction bearing metal, such as Babbitt metal, lead or other suitable material which is first reduced to a shredded or comminuted form in any approved manner. When thus reduced, I take the shredded or comminuted mass and immerse the same in water to become thoroughly saturated, after which in its saturated condition, it is immersed in a solid lubricant, such as graphite, to such extent, that the shredded or comminuted particles become fully covered with the lubricant. In the coated and moist condition, the shredded or comminuted mass is reduced by compression into a solid mass to the form of a journal bearing. This latter step of my method or process is preferably done in the following manner. A shell or holder 10 of cast metal having a pocket or chamber formed with under cut end and side edges is utilized, into which the saturated coated mass is forced under a heavy pressure to the extent of positively filling the pocket of the shell and leaving the bearing surface of the previously treated mass of anti-friction metal projected beyond the plane of the under edges of the shell 10 as shown in the simplest form of my invention illustrated in Fig. 1 and when arranged in the form just described, the entire under or bearing surface of the bearing will consist of a highly compressed mass of threads or comminuted particles of anti-friction bearing metal.

In the preferred form of my invention, before forcing the saturated and coated anti-friction bearing metal particles into the shell 10, I insert into the shell 10 a supplemental bearing member of bronze metal, which member designated S, consists of a rectangular frame S that snugly fits into the sides and ends of the cast metal shell or holder 10 and formed at the ends and sides with a shouldered rectangular extension S'—S², the end portions of which extend under the ends of the cast shell or frame while the sides are likewise shouldered and extended under the lower edges of the shell 10, thus providing as it were, a soft bearing substance on the under edges of the shell that will engage the axle or shaft and form as it were, a supplemental bearing member for the shell or box which can be readily replaced in case of wear. The member S' is held to its place on the shell by the compressed mass of the main bearing body M, which engages the journal at points between the ends and sides of the shell or casing. The side member of the supplemental or bronze metal frame need not however, extend under the side edges of the frame, since the width of the shell can be such that the main or compressed mass of saturated metal shreds can be so formed that its opposite sides will extend sufficiently beyond the opposite edges of the journal or shaft, see Fig. 7 to take up considerable wear before the sides of the shell 10 proper could move down and contact with the journal. Instead of shredding the anti-friction bearing metal, the same could be pulverized and mixed with the graphite and in its mixed or saturated condition, pressed into the shell, but I prefer to shred the metal as before stated.

By reason of construction, a bearing made in the manner stated, will at once in use, assure a proper lubrication on the entire bearing surface and little or no oil will be required to prevent wear and heating.

While I have stated the shell 10 as being cast, it is manifest such shell may be pressed and the shape, *per se*, of the shell may be modified to suit the special journal construction for which a bearing may be required.

Among the advantages obtained by my invention is, it can be manufactured much cheaper and will give longer service than is now found in the use of the types of bearings before referred to, and when using the preferred form, the main shell can be easily renewed, that is resupplied with a new bearing substance, since a new supplemental bronze bearing frame can be substituted for the old and the necessity of destroying or selling the shells for scrap after the bearing surfaces are once worn, as is now the practice in the ordinary types of journal bearings of the kind stated is avoided.

Having thus described my invention, what I claim and desire to secure by Letters Patent, is:

1. A process of producing journal bearings, which consists of reducing a suitable anti-friction bearing metal into a shredded form, immersing the same in its shredded state in water, then coating same with graphite or other like lubricant and then compressing the moist and lubricant coated mass into a suitable receiver, as set forth.

2. A journal bearing comprising a hard metal shell, members of bearing metal detachably mounted over the lower ends of the hard metal shell and a bearing metal composition held in the shell and between the detachable bearing members, substantially as shown and described.

3. The combination in a journal bearing of the character described, with a hard metal shell; of a bearing metal member adapted to detachably fit over the lower side and end edges of the shell, said member having internal inwardly beveled flanges and a composition consisting of a highly compressed graphite coated shredded mass, held within the shell and the detachable bearing frame substantially as shown and described.

DAVID H. STEWART.

Witnesses:
ALBERT ROGERS,
L. A. VOCKRODT.